United States Patent [19]

Carter et al.

[11] Patent Number: 4,891,190
[45] Date of Patent: Jan. 2, 1990

[54] INCRUSTATION RESISTIVE CRYSTALLIZER EMPLOYING MULTIFREQUENCY VIBRATIONS

[75] Inventors: Don E. Carter, Creve Couer; Yung C. Hsu, Chesterfield, both of Mo.

[73] Assignee: Monsanto Company, St. Louis, Mo.

[21] Appl. No.: 738,899

[22] Filed: May 29, 1985

Related U.S. Application Data

[63] Continuation of Ser. No. 466,445, Feb. 15, 1983, abandoned.

[51] Int. Cl.$^4$ ............................................. B01D 9/00
[52] U.S. Cl. .................................... 422/251; 422/254
[58] Field of Search ...................... 422/254, 251, 245; 62/532, 538, 544

[56] References Cited

U.S. PATENT DOCUMENTS

| | | | |
|---|---|---|---|
| 1,983,805 | 12/1934 | Munson et al. | 422/245 |
| 3,375,082 | 3/1968 | Graf | 422/251 |
| 4,188,797 | 2/1980 | Thijssen et al. | 62/545 X |
| 4,257,796 | 3/1981 | Arkenbout | 62/538 |
| 4,296,612 | 10/1981 | Allo | 62/532 X |

FOREIGN PATENT DOCUMENTS

1365536  9/1974  United Kingdom .................. 62/538

OTHER PUBLICATIONS

European Patent Application—Pub. No. 0 034 852, Application No. 81200148.5—filing date 5/2/81, Arkenbout et al.

*Primary Examiner*—Gary P. Straub
*Attorney, Agent, or Firm*—Dennis R. Hoerner; Charles E. Smith; James W. Williams, Jr.

[57] ABSTRACT

An incrustation resistive crystallizer apparatus is disclosed. The crystallizer housing has conduit means for ingress of solution to be crystallized, separate conduit means for ingress and egress of cooling fluid, means for recovery of mother liquor and product crystals either together or separately. A plurality of essentially horizontal perforated plates substantially conforming to the interior shape of the housing are vertically spaced along the housing length. A support member capable of translational movement along the housing length holds the plates in the above-described position. A plurality of mobile bodies are disposed on the upper surface of the plates. A heat transfer conduit disposed substantially parallel to the coaxial support member penetrates through apertures in the horizontal plates. A compound excitation device adapted to produce two waveforms is attached to the support member. The first waveform causes translational plate movement for scraping the surface of the heat transfer conduit. The second waveform causes the plates to vibrate causing the mobile bodies thereon to agitate and collide with each other and the surface of the heat transfer conduit.

13 Claims, 4 Drawing Sheets

INCRUSTATION RESISTIVE CRYSTALLIZER EMPLOYING MULTIFREQUENCY VIBRATIONS

This is a continuation of application Ser. No. 466,445 filed Feb. 15, 1983 now abandoned.

BACKGROUND OF THE INVENTION

This invention relates to an improved apparatus for crystallization processes and more specifically to a type of crystallizer having a plurality of vibrating perforated plates at intervals along the crystallizer length.

A major problem in carrying out industrial crystallizations by indirect heat transfer from saturated solutions is the phenomenon called incrustation. Incrustation is the deposition of precipitated or crystalline solids on the surface through which heat is transferred from the saturated solution to the cooling fluid. Such incrustations reduce the rate of heat transfer and make necessary frequent shutdowns for cleaning of equipment.

Designers of industrial crystallizers have attempted to abate incrustations by providing scrapers to continuously remove solid deposits from the heat transfer surface. A typical design comprises a set of horizontal jacketed pipes each having a centrally located rotating shaft with peripheral scrapers. The solution to be crystallized is pumped through the inner pipe while cooling fluid is concurrently pumped through or vaporized in the annulus. Heat is extracted from the solution, crystals are formed, and incrustations develop on the wall of the inner pipe. The rotating scrapers remove the incrustations from the heat transfer surface.

The scrapers have proven to be somewhat effective by increasing run duration from a few minutes or hours to one to fourteen or more days. However, at commercially acceptable heat fluxes the scrapers and rotating shafts themselves become incrusted. The incrustation can become so thick that the inner pipe becomes plugged or the rotating members are damaged. Before this happens it is necessary to shut down the crystallizer and clean the inner pipe by heating it to melt the solid deposits, by washing it with solvent or by manually scraping it.

Other commercially available crystallizers include a set of internally cooled plates disposed in a vertical or horizontal tank. Such designs usually include a rotating shaft to which wipers are attached. The wipers are positioned so that the surfaces of the plates are wiped as the shaft rotates. However, if the temperature differential is increased to provide a good production rate, the shaft, wipers or plates rapidly become incrusted requiring an interruption in operation to melt off the incrustations.

Attempts at improving conventional designs have further comprised heating the scrapers with electric or hot fluid tracers while the scrapers are rotating. Although this can be somewhat effective, in doing so one usually puts a great deal of heat back into the solution to be cooled and thus limits the capacity of the equipment in addition to increasing operating cost. In any event, the effective installation of heaters on mechanically complicated scrapers is difficult and expensive.

Heat transfer surfaces in crystallizers can be kept clean by inducing ultrasonic vibrations in them. This method does in fact work well in laboratory apparatus. Unfortunately, no way has been found to scale up ultrasonic crystallizer units to a commercially acceptable capacity.

The rate of formation of incrustations generally increases rapidly as the difference in temperature between the solution to be crystallized and the cooling fluid increases. As a practical matter, operators of crystallizers generally limit the temperature differential to a magnitude at which they are able to get a fairly long run time between cleanings. However, operating at low temperature differentials requires relatively large surface areas and correspondingly large capital investment to provide commercially acceptable capacity. If higher temperature differentials could be used, there would often be a substantial reduction in crystallizer capital cost.

British patent No. 1,365,536 discloses a countercurrent crystallizer apparatus which comprises individual crystallization, purification, and melt sections. The purification section comprises a plurality of perforated plates positioned at spaced intervals in a cylindrical enclosure so that the crystal mass may pass the plates countercurrently to the mother liquor. Free moving bodies such as spheres are placed on each perforated plate. The spheres are set in motion by vibrating the entire column, vibrating the set of perforated plates or by other means. Although this invention does increase the purification efficiency, it still suffers from the short run time chracteristic of conventional crystallizers because this invention incorporates conventional chillers to generate the crystal crop that is subsequently purified in the above-described purification section.

It is the overall object of the present invention to provide an improved apparatus for making crystals by removing heat from a solution or slurry.

Accordingly, it is an object of the present invention to provide a crystallizer apparatus with high heat transfer coefficients relative to prior art apparatus.

It is another object of the present invention to provide a crystallizer apparatus capable of long run times between cleanings.

It is yet another object of the present invention to provide an efficient crystallizer column which can be economically scaled up to commercial size.

These and other objects and advantages will become apparent to those skilled-in the art from the following description and figures.

SUMMARY OF THE INVENTION

According to the present invention, there is provided a crystallizer column comprising a plurality of substantially horizontal perforated plates periodically attached to a central shaft located coaxially within a normally elongated housing. Cylindrical housings are normally used for convenience in fabrication, but housings having square, triangular, or other cross-sectional shapes can be used and in some instances may be preferred. A plurality of heat transfer tubes extend along the axial length of the column through apertures fabricated in the horizontal plates. Mobile bodies substantially cover the surface area of each perforated plate. A compound excitation device adapted to produce two waveforms is attached to the central shaft. Frequency waveform that results in the mobile bodies colliding with one another, the inner surface of the enclosure and the surface of the heat transfer tubes. The second waveform is a high amplitude, low frequency waveform that causes the plates to move along the length of the heat transfer surfaces so that the surfaces are scraped of any incrustations that form.

To operate the above-described apparatus one fills the enclosure with solution to be crystallized and then starts the compound excitation device. Next, one starts the flow of cooling fluid through the heat transfer tubes. After sufficient heat has been removed from the solution, nucleation will occur and solid crystals will form. In normal applications, the crystallizer can be operated continuously by introducing feed solution near the bottom of the column while simultaneously removing product crystals from the bottom and mother liquor from the top of the crystallizer column.

It should be understood that while the following embodiments comprise an inner cooling means, other embodiments using an outer cooling means such as that provided by a jacketed housing are clearly within the scope of the present invention.

DETAILED DESCRIPTION OF THE PREFERRED EMBODIMENTS

Figure 1:
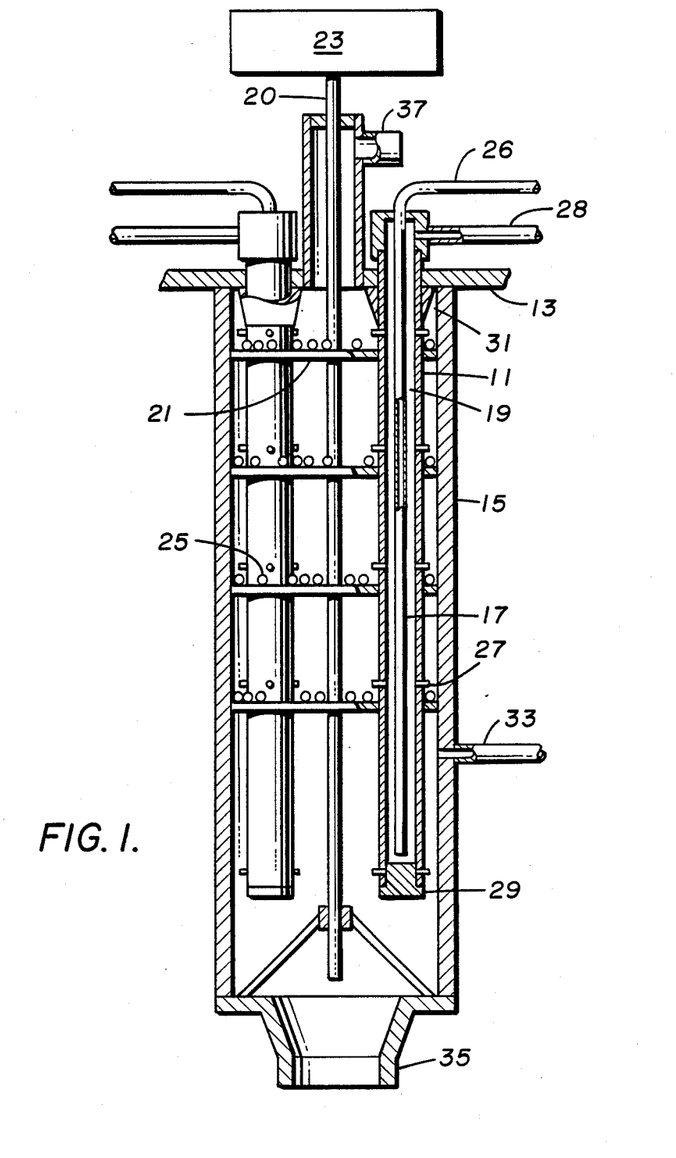
FIG. 1 is a longitudinal, cross-sectional view of a single cooling stage crystallizer according to the present invention.

Referring to FIG. 1, a plurality of heat transfer tubes 11 pass through top flange 13 of an essentially cylindrical enclosure 15. A smaller diameter tube 17 runs down the center of each heat transfer tube 11. Cooling fluid is pumped through cooling fluid inlet port 26 in fluid communication with smaller cooling tube 17 and flows upward through annulus 19 between the outer wall of tube 17 and the inner wall of heat transfer tube 11. Cooling fluid is removed through cooling fluid outlet port 28 in fluid communication with annulus 19. These heat transfer assemblies are of the type known as "cold fingers". It should, however, be evident to those skilled in the art that it is possible to design a crystallizer apparatus according to the principles of the present invention in which the heat transfer tubes are not cold fingers, but tubes extending between tube sheets as in a conventional shell and tube heat exchanger.

A vertical shaft 20 passes along the axis of enclosure 15. A plurality of horizontal perforated plates 21 are attached to vertical shaft 20. Perforated plates 21 are fabricated so that the perforations are relatively small but large enough to allow crystals to pass therethrough. By describing the plates as perforated it is meant that the plates have apertures of any suitable cross-sectional shape such as round, elliptical, rectangular, square, triangular, etc. The perforated plates are sized so that their circumference is within about ⅛ inch of cylindrical enclosure 15. Heat transfer tubes 11 pass through apertures fabricated in each perforated plate. The clearance between perforated plates 21 and heat transfer tubes 11 should be as small as is reasonably possible. Exact tolerances will depend on actual unit size and economy of fabrication and erection. While the preferred embodiment herein described refers to perforated plates, it is evident to one skilled in the art that any sufficiently rigid semipermeable platen such as a wire mesh platen can be used in the present invention and that the present invention is operable with at least one of the aforementioned plates.

Vertical shaft 20 is attached to a compound excitation device 23 capable of transmitted reciprocating axial movement to the central shaft. Mobile bodies 25, preferably of spherical s"ape, are placed on each perforated plate 21. The mobile bodies cover greater than about 10% of the area of each perforated plate. In some instances it may be beneficial to have more than one layer of mobile bodies on selected perforated plates. Mobile bodies should be large enough not to penetrate the perforations in the horizontal plates or penetrate the opening between the circumference of plate 21 and the inner wall of enclosure 15. It should be understood that the exact size and density of the mobile bodies, extent of plate coverage and materials of construction will necessarily depend on the specific application.

The compound excitation device imparts two axial motion waveforms to shaft 20. One waveform, hereinafter called the fast waveform, is a high frequency, low amplitude waveform which causes the mobile bodies to agitate on the perforated plates, impacting themselves, the perforated plates, and the surface of the heat transfer tubes thereby dislodging and comminuting crystal aggregates. A suitable waveform for this motion is a sinusoidal waveform with amplitude of about 1 mm (2 mm peak to peak) and frequency of 25 hertz. However, it should be understood that other waveforms having other combinations of amplitude and frequency particularly non-sinusoidal waveforms may be used to impart an appropriate motion on the mobile bodies. Waveforms in which acceleration is constant are particularly preferred to minimize stresses in the equipment. The preferred amplitude range is from about 0.1 mm to about 10 mm, although higher or lower amplitude can be useful in specific applications. The frequency of the fast waveform must be at least great enough to overcome gravity and to cause the mobile bodies to bounce around, impact one another and the surface of the heat transfer tubes. Mechanical limitations set the practical upper limit which would approximately lie in the 40–200 hertz range. The preferred range is from the minimum to cause mobile bodies 25 to bounce to about 40 hertz.

The other waveform, hereinafter called the slow waveform, is a slower, larger amplitude waveform than the first waveform. The slow waveform causes the perforated plates to move periodically along the entire length of the heat transfer tubes and scrape accumulated crystal deposits from their surfaces. The amplitude of this second waveform should be at least as great as the axial distance between adjacent perforated plates to ensure that the entire surface of the heat transfer tubes between adjacent plates is cleaned. Preferably, the velocity of this slow waveform is linear with displacement, although other waveforms are possible. The temporal duration of upward and downward plate movement need not be equal.

When operating the crystallizer of this invention at high temperature differences between the slurry and cooling fluid a thick annular layer of crystals may form around the heat transfer tubes between, adjacent plates and tend to slide up and down with the slow waveform movement of the plates. To alleviate this problem pins or wedges 27 are attached on opposite sides of the heat transfer tubes. With this modification, as a layer of crystals starts to slide on the heat transfer tubes, it is forced against pins 27 and splits into two sections which fall away and are ground up by the action of the mobile bodies.

As previously mentioned, it is preferred that the entire length of the tubes where heat transfer occurs be scraped by the perforated plates. For this reason, the lower ends of the heat transfer tubes are plugged with solid plugs 29 to keep "icicles" of crystals from growing from the bottom of the tubes. The uppermost portion of the heat transfer tubes are insulated with conical frustums 31 made of a suitable material such as tetrafluoroethylene. The conical frustums have a dual function of insulating the heat transfer tubes and splitting off layers of crystals pushed up toward them. It is also important that the flanges and walls of the crystallizer in contact with the crystal slurry not be cooled by radiation to the extent which would cause incrustations to form on them. Methods to accomplish this by isolation, insulation or mild heating should be evident to persons skilled in the art.

To operate the above-described crystallizer, one closes crystal slurry outlet port 35, fills enclosure 15 with solution to be crystallized through inlet port 33 and then starts the compound excitation device 23. Next, one starts the flow of cooling fluid through heat transfer tubes 11. After sufficient heat has been removed from the solution, nucleation will occur and solid crystals will begin to form in the solution. The solid crystals formed will tend to adhere to the surfaces of heat transfer tubes 11, but will be removed by the axial translation of plates 21 and the repeated impacts of mobile bodies 25 on the surfaces of the heat transfer tubes 11. The crystal particles scraped from the heat transfer tube surface are reduced in size by the impacting action of the mobile bodies so that the resulting slurry flows freely through the perforations in the horizontal plates.

The crystallizer can be operated either batchwise, semicontinuously or continuously. In batchwise operation, the slurry is drained from the crystallizer, fresh solution is charged and the process described above is repeated. In semicontinuous operation, fresh solution is pumped rapidly into the crystallizer to displace from the crystallizer unit the concentrated slurry already formed, and another batch of crystals are made. The distinction between batch and semi-continuous operation is that in the latter the crystallizer is not emptied between batches. In the preferred continuous countercurrent operation, solution is fed to the crystallizer continuously through solution inlet port 33 and crystals and mother liquor withdrawn continuously through crystal slurry outlet port 35 and liquor outlet port 37, respectively. It will be evident to those skilled in the art that the respective locations of inlet and outlet ports for crystals and mother liquor may be reversed depending on the relative density between these two phases.

In continuous operation it is frequently desired to have the solid crystals move toward one end of the crystallizer and the mother liquor toward the other. The movement of crystals toward one end, usually the bottom of the crystallizer, can be promoted by stopping the plate vibration generated by the fast waveform and moving the perforated plates assembly downward fairly rapidly. In this situation, the perforated plates serve essentially as filters. Filter cakes collect on the underneath side of the plates and regions of substantially clarified filtrate develop above them. When the lower point of travel of the plates is reached the fast waveform is turned on. The liquids and solids in the compartments between adjacent plates are mixed and the upward movement component of the slow waveform commences.

Although the above-described embodiment is represented as having a countercurrent flow of product crystals and mother liquor, it is evident to one skilled in the art that in some instances, such as in cascade arrangements, a concurrent flow may be preferred. The above-described crystallizer apparatus can be easily adapted for such operation by closing the outlet port nearest the feed solution inlet port so that crystals and mother liquor flow in the same direction along the crystallizer length.

Some crystallizers such as those disclosed in U.S. Pat. Nos. 4,188,797 and in 3,645,699 claim advantages in separation and energy savings from carrying out the crystallization process stagewise, that is, cooling the feed to generate a partial crop of crystals, recovering these crystals and sending them onto further purification by contact with pure reflux in a wash column, and cooling the mother liquor in a second stage to generate another crop of crystals which are separated and returned to the feed stage. This process is then repeated in successive stages to reduce the crystallizing component concentration in the mother liquor to an appropriately low concentration.

The energy saving comes from the fact that the cooling fluid temperature can be higher in the feed stage and those stages near it than in the stage producing mother liquor. The improved separation comes from the fact that in general, the higher the concentration of crystallizing component in the mother liquor, the higher the purity of the crystal formed. In addition, it is generally believed that in cascades such as the one described above, the crystals moving toward the feed stage will tend to dissolve as they enter higher temperature stages and regrow from the purer liquor in the stage.

Figure 2:
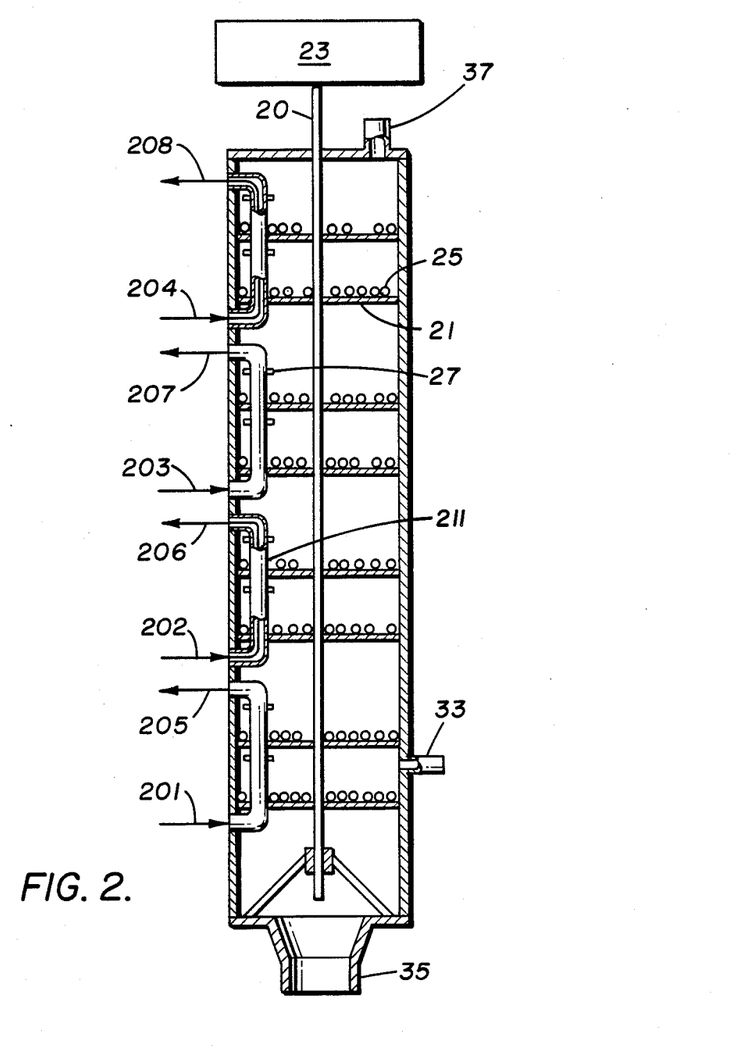
FIG. 2 is a longitudinal, cross-sectional view of a single column crystallizer with multiple cooling stages according to the present invention.

FIG. 2 shows a multistage embodiment of the present invention contained within a single housing. The overall cooled length to diameter ratio of the crystallizer is increased from about 17/4 to within the range of about 30/4 to about 100/4. In the presently described embodiment, heat transfer tubes 211 are distributed along the axial length of the crystallizer column. Heat transfer tubes 211 have separate cooling fluid inlets 204, 203, 202, 201 and outlets 208, 207, 206, and 205. The feed solution enters at inlet port 33 located near the bottom of the cooling section. Cooling fluids of different temperatures are supplied to inlets 204, 203, 202 and 201. Usually, cooling fluid temperatures are lowest at the upper part of the heat transfer tubes and increase in temperature down the axial length of the crystallizer, although other temperature profiles may be found more effective in some specific cases.

The liquid feed solution entering at inlet port 33 is first cooled in the lowest compartment making a partial crop of crystals. These crystals settle out and are removed through exit port 35 located at the bottom of the crystallizer. The mother liquor passes out the top of the section into the next section above where it is cooled by cooling fluid entering at 202. Crystals formed in this section settle out into the next section below and mother liquor passes to the next section above. This stagewise process is continued until the mother liquor is cooled to a predetermined temperature and is removed through mother liquor outlet port 37. As crystals are formed and settle out to the next section below they pass from regions of lower to higher temperature where they dissolve and new crystals of improved purity grow from purer mother liquor. The action of vibrating perforated plates 21 and mobile bodies 25 promote this dissolution-regrowth process by breaking up the crystals so that they can dissolve more readily. It will be evident to those skilled in the art that precautions must be taken to prevent incrustations from forming on the cooling fluid inlet and outlet ports since these areas are not scraped clean by the axial movement of the perforated plates. Suitable precautions include, but are not limited to insulating or heating the cooling fluid inlet and outlet ports.

Figure 3:
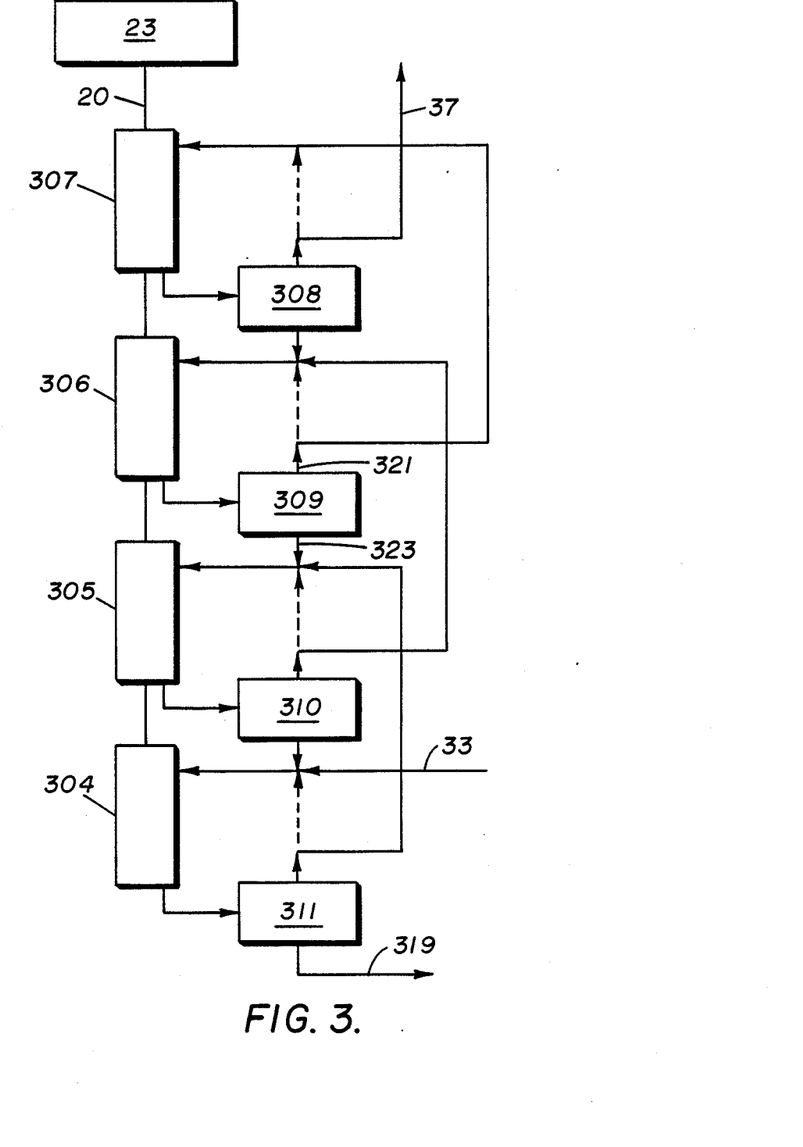
FIG. 3 is a simplified schematic view of a multistage cascade type crystallizer according to the present invention.

Another multistage embodiment of the present invention is shown in FIG. 3 wherein individual stages are contained in separate vessels 304, 305, 306 and 307. Separation devices 308, 309, 310 and 311 are provided to separate the crystal and mother liquor effluents from each stage. Suitable devices are filters, centrifuges and thickeners. Screw filter thickeners of the type disclosed in U.S. Pat. No. 4,188,797 are suitable for use in the present invention. Solution feed is introduced through inlet port 33 into the top of stage 304. The liquid from each separation device is passed to the stage above in the cascade, while the recovered crystals are passed to the stage below. For example referring to separation device 309, liquid stream 321 is passed to stage 307 while crystal stream 323 is passed to stage 305. The crystal product is withdrawn from separation device 311 in crystal product stream 319. In some cases it may be desirable, to bypass part of the mother liquor from a thickener back to the stage to control the crystal slurry concentration in the stage to maintain proper flow properties or to give more time for mass to be exchanged by the influence of the vibrating plates and mobile bodies within the stage. Routing the mother liquor and crystal streams in the above-described manner results in concurrent flow of these streams within individual stages and countercurrent flow of mother liquor and product crystals overall.

Figure 4:
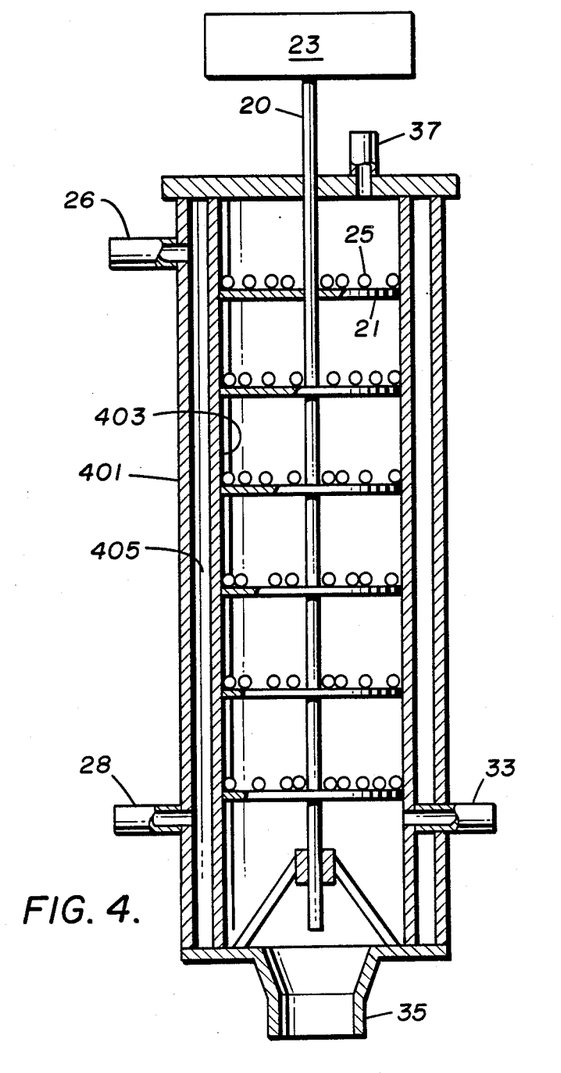
FIG. 4 is a longitudinal, cross-sectional view of a single stage crystallizer with an outer cooling jacket according to the present invention.

While the preferred embodiments described heretofore comprise the use of an inner cooling means, it is evident to one skilled in the art that embodiments comprising an outer cooling means can be fabricated while remaining within the spirit of the present invention. FIG. 4 shows one such embodiment wherein the cooling fluid is circulated through or vaporized in an outer cooling zone 405 formed by the annular space between the inner wall of the crystallizer housing 401 and the outer wall of the heat transfer surface 403. The crystallizer apparatus of this embodiment operates in like manner to that shown in FIG. 1 except that the perforated plates 21 must be fabricated so that they substantially conform to the interior cross-sectional shape of the heat transfer surface 403. The slow waveform causes the plates to move along the crystallizer length and scrape heat transfer surface 403 of any incrustations formed. It should be further evident to those skilled in the art that the embodiment of FIG. 4 can be easily adapted to give other embodiments similar to those shown in FIG. 2 and FIG. 3.

It should be understood that the above described embodiments of the present invention are not intended to limit the scope of the invention. Moreover, it is evident that various engineering and fabrication modifications such as support member design would be required in constructing a commercial crystallizer unit while not departing from the spirit of the present invention.

EXAMPLE

A stainless steel crystallizer fabricated as described above was used to continuously crystallize p-dichlorobenzene from a solution of o-dichlorobenzene and p-dichlorobenzene. The dimensions of the crystallizer and operating conditions are set forth in Table I.

TABLE I

| | |
|---|---|
| Cooling tube outside diameter | 0.5 in. |
| Cooling tube inside diameter | 0.44 in. |
| Water inlet tube diameter | 0.25 in. |
| Active length of tubes | 17 in. |
| Number of Tubes | 6 |
| Diameter of tube circle | 2 ½ in. |
| Inside dia. of crystallizer | 4 in. |
| Number of perforated plates | 4 |
| Plate spacing | 3¾ in. |
| Plate support rod diameter | 9/16 in. |
| Plate perforation | 2 mm holes on 3 mm centers triangular pitch |
| Plate thickness | 1/16 in. |
| Balls (mobile bodies) | steel, ⅜ in. dia. 90% of tray covered |
| Fast waveform character | sinusoidal (off during downstroke of slow waveform) |
| Frequency | 25 hertz |
| Amplitude | 1 mm (2 mm peak to peak) |
| Slow waveform character | linear |
| Stroke | 4 in. |
| Upward speed | 0.2 in/sec |
| Downward speed | 0.73 in/sec |

The rate of heat transfer to the crystallizing slurry was measured by a heat balance on the cooling water. Overall heat transfer coefficients calculated from the experimental data are listed in column 6 of Table II. Part of the resistance to heat transfer is the cooling water side film coefficient, which can be estimated using equation (10–41), *Chemical Engineers Handbook*, R. H. Perry and C. H. Chilton, 5th ed., Mc Graw Hill, 1973. Using the estimated water side heat transfer coefficients calculated from the above-mentioned equation, the calculated crystal side heat transfer coefficient is listed in column 7 of Table II.

It should be evident to those skilled in the art that the heat transfer coefficients for the crystallizer according to the present invention are high relative to those for many other crystallizers. When the temperature differential is relatively high, as in Run 1, a decrease in heat transfer coefficient occurred as expected. An increase in the velocities of the slow waveform in Run 1 would result in an expected increase in the overall and crystallizer film heat transfer coefficients. However, this could not be demonstrated with the apparatus used due to mechanical limitations.

While direct experimental data on crystal formation could not be obtained since the crystallizer was operated in combination with a crystal purifier, Table III shows an overall mass balance for the crystallizer unit based on the corresponding heat balance for the unit as shown in Table II. Runs 1 and 4 reflect batch operations with total crystal melt recycle. Runs 2 and 3 reflect continuous operation with partial crystal melt recycle.

TABLE II

| RUN | Cooling Water Flow (lb/tube-hr) | Crystallizing Slurry (°C.) | Cooling Water In (°C.) | Cooling Water Out (°C.) | Temperature Overall Heat Transfer Coeff. BTU hr-ft²-°F. | Calculated Crystallizing Side Heat Transfer Coeff. BTU hr-ft²°F. |
|---|---|---|---|---|---|---|
| 1 | 154 | 41 | 15.5 | 17.1 | 55 | 65 |
| 2 | 124 | 46 | 33.5 | 34.8 | 74 | 93 |
| 3 | 154 | 45 | 31.5 | 33.1 | 108 | 151 |
| 4 | 129 | 45 | 31.5 | 32.7 | 68 | 83 |

TABLE III

| RUN | FLOW RATE (lb/hr) Net Crude Feed | Crystal Melt Recycle | Crystal Outlet | Mother Liquor Outlet | CONCENTRATION (wt. %) p-DICHLOROBENZENE Crude Feed | Mother Liquor |
|---|---|---|---|---|---|---|
| 1 | 0 | 48.4 | 48.4 | 0 | 80.0 | 74.0 |
| 2 | 12.2 | 23.5 | 32.0 | 3.7 | 95.0 | 83.5 |
| 3 | 6.2 | 46.1 | 49.8 | 2.5 | 93.0 | 82.7 |
| 4 | 0 | 30.2 | 30.2 | 0 | 95.0 | 82.7 |

We claim:

1. A crystallizer apparatus comprising in combination:
   (a) a crystallizer housing having conduit means for ingress of solution to be crystallized, separate conduit means for ingress and egress of cooling fluid, means for recovery of mother liquor and product crystals either together or separately;
   (b) at least one substantially horizontal plate having apertures, said plate disposed within said crystallizer, said plate substantially conforming to the interior shape of the crystallizer;
   (c) at least one support member fixed to said plate such that said plate is maintained in position described in part (b), said member being capable of translational movement along the length of the crystallizer;
   (d) a plurality of mobile bodies disposed on the upper surface of said plate;
   (e) heat transfer means within said housing disposed substantially parallel to said support member;
   (f) excitation means cooperating with said support member and adapted to impart a first waveform to cause translational plate movement for scraping the surface of said heat transfer means; and
   (g) excitation means cooperating with said support member and adapted to impart a second waveform to cause said plate to vibrate causing said bodies thereon to agitate and collide with each other, the surface of said heat transfer means, the support member and the inner wall of the crystallizer.

2. The apparatus of claim 1 wherein said mobile bodies are substantially spherical in shape.

3. The apparatus of claim 1 wherein said mobile bodies cover than about 10 percent of the surface of said plates.

4. The apparatus of claim 1 wherein said excitation means of part (f) is adapted to generate a first waveform having an amplitude at least as great as the spacings between adjacent plates.

5. The apparatus of claim 1 wherein said excitation means of part (9) is adapted to generate a second waveform having a frequency less than about 100 hertz.

6. The apparatus of claim 2 wherein said excitation means of part (g) is adapted to generate a second waveform having a frequency less than about 200 hertz.

7. The apparatus of claim 1 wherein said heat transfer means has a plurality of pins attached thereon and projecting essentially perpendicular therefrom.

8. A crystallizer apparatus comprising in combination:
   (a) a crystallizer housing having conduit means for ingress of solution to be crystallized, separate conduit means for ingress and egress of cooling fluid, means for recovery of mother liquor and product crystals either together or separately;
   (b) at least one substantially horizontal plate having apertures, said plate disposed within said housing, said plate substantially conforming to the interior shape of said housing;
   (c) at least one support member fixed to said plate such that said plate is maintained in position as described in part(b), said member being capable of translational movement along length of said housing;
   (d) a plurality of mobile bodies disposed on the upper surface of said plate;
   (e) at least one heat transfer conduit within said housing disposed substantially parallel to said support member and penetrating through apertures in said plate;
   (f) excitation means cooperating with said support member and adapted to impart a first waveform to cause translational plate movement for scraping the surface of said heat transfer conduit; and
   (g) excitation means cooperating with said support member and adapted to impart a second waveform to cause said plate to vibrate causing said bodies thereon to agitate and collide with each other, the inner wall of said housing, the support member and the surface of said heat transfer surface.

9. A crystallizer apparatus comprising in combination:
   (a) a crystallizer housing having conduit means for ingress of solution to be crystallized, separate conduit means for ingress and egress of cooling fluid, means for recovery of mother liquor and product crystals either together or separately;

(b) a plurality of substantially horizontal plates having apertures, said plates disposed within said housing, said plates substantially conforming to interior shape of said housing;

(c) at least one support member fixed to said plates such that said plates are maintained in position as described in part (b), said member being capable of translational movement along length of said housing;

(d) a plurality of mobile bodies disposed on the upper surface of said plates;

(e) a plurality of heat transfer conduits disposed along the crystallizer housing length and penetrating through said plates, each conduit having means for ingress and egress of cooling fluid so that the crystallizer is divided into a plurality of discrete cooling stages;

(f) excitation means cooperating with said support member and adapted to impart a first waveform to cause translational plate movement for scraping the surface of said heat transfer conduit; and (g) excitation means cooperating with said support member and adapted to impart a second waveform to cause said plates to vibrate causing said bodies therein to agitate and collide with each other, the inner wall of said housing, the support member and the surface of said heat transfer surface.

10. A cascade type crystallizer apparatus comprising in combination:

(a) a plurality of individual crystallizer apparatus as described in claim 8;

(b) means for separating crystals and mother liquor recovered from each individual crystallizer apparatus of part (a);

(c) conduit means for feeding recovered crystals to the top of the adjacent crystallizer unit downstream in the cascade;

(d) conduit means for feeding recovered mother liquor to the adjacent crystallizer unit upstream in the cascade; and (e) conduit means for feeding solution to be crystallized into the top of the last crystallizer in the cascade.

11. A crystallizer apparatus comprising in in combination:

(a) an outer crystallizer housing having conduit means for ingress of solution to be crystallized, separate conduit means for ingress and egress of cooling fluid, means for recovery of mother liquor and product crystals either together or separately;

(b) an inner heat transfer conduit within and substantially parallel to said outer housing thereby defining an annular cooling fluid zone between the inner wall of said outer housing and the outer wall of said inner heat transfer conduit;

(c) at least one substantially horizontal plate having apertures, said plate disposed within said housing said plate substantially conforming to the interior shape of said heat transfer conduit;

(d) at least one support member fixed to said plate such that said plate is maintained in position as described in part (c), said member being capable of translational movement along length of said inner heat transfer conduit;

(e) a plurality of mobile bodies disposed on the upper surface of said plate;

(f) excitation means cooperating with said support member and adapted to impart a first waveform to cause translational plate movement for scraping the inner surface of said heat transfer conduit; and (g) excitation means cooperating with said support member and adapted to impart a second waveform to cause said plate to vibrate causing said bodies thereon to agitate and collide with each other, the support member and the inner surface of said heat transfer conduit.

12. A crystallizer apparatus as described in claim 11 wherein said annular cooling fluid zone is divided into a plurality of smaller cooling zones, said smaller cooling zones each having separate means for ingress and egress of cooling fluid.

13. A cascade type crystallizer apparatus comprising in combination:

(a) a plurality of individual crystallizer units as described in claim 11;

(b) means for separating crystals and mother liquor recovered from each individual crystallizer apparatus of part (a);

(c) conduit means for feeding recovered crystals to the top of the adjacent crystallizer unit downstream in the cascade;

(d) conduit means for feeding recovered mother liquor to the adjacent crystallizer unit upstream in the cascade; and (e) conduit means for feeding solution to be crystallized into the top of the last crystallizer in the cascade.

* * * * *